March 28, 1967    R. E. LEE ETAL    3,311,267
MEASURING ATTACHMENT FOR BEER KEG OR THE LIKE
Filed June 29, 1966
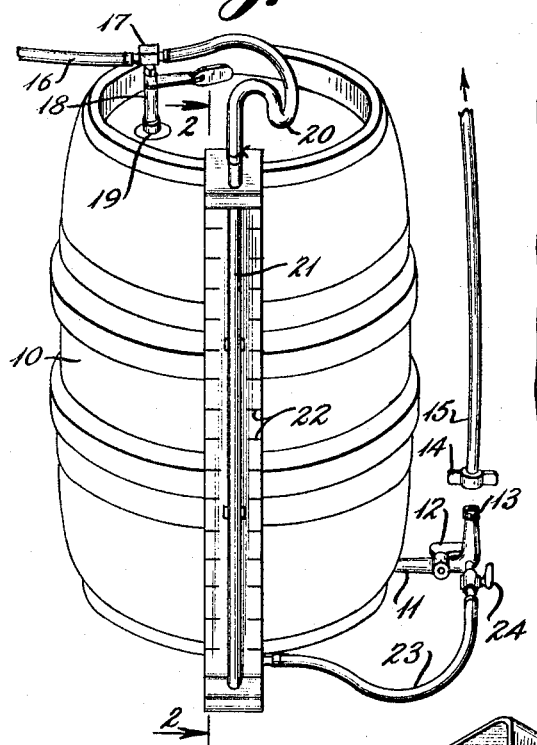
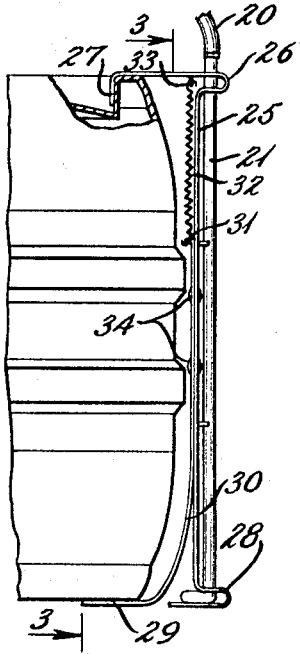
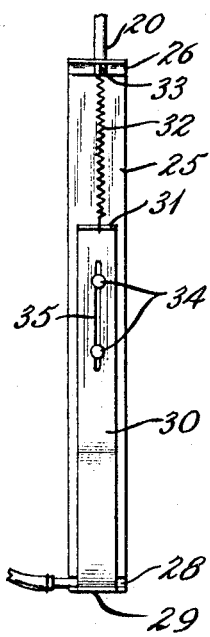
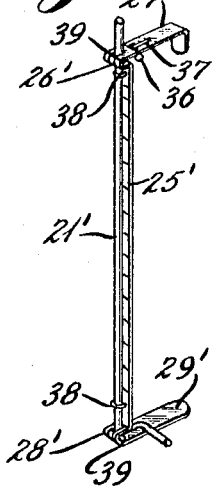
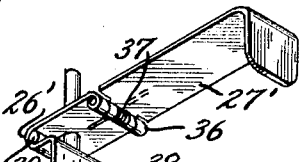
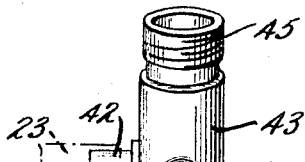
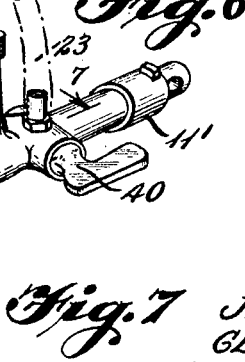
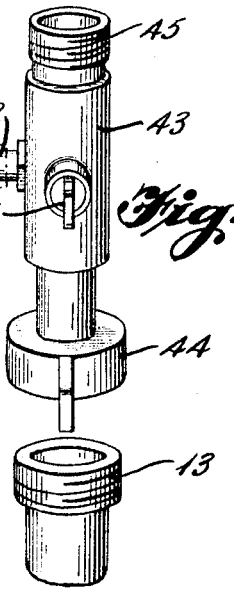
INVENTORS
RYALS E. LEE,
JAMES E. HOUSTON &
GEORGE M. NORMAN
BY
ATTORNEYS

United States Patent Office 3,311,267
Patented Mar. 28, 1967

3,311,267
MEASURING ATTACHMENT FOR BEER
KEG OR THE LIKE
Ryals E. Lee, 420 Plantation Road 32303; James E.
Houston, Rte. 4, Box 463 32301; and George M.
Norman, 3308 Lake Shore Drive 32303, all of Tallahassee, Fla.
Filed June 29, 1966, Ser. No. 561,438
7 Claims. (Cl. 222—155)

This invention relates to the dispensing of liquids including beer from closed opague kegs or containers subjected to pressure to discharge the contents and with regard to which it is desirable to be able to determine the amount of liquid contained at any particular time between the initial dispensing and exhausting of the contents of such keg or container.

It is an object of the invention to provide a simple, practical, readily usable, measuring attachment for a beer keg or the like, which can be quickly applied and removed, and by means of which an immediate reading of the contents can be made at any time.

Other objects will be apparent from the accompanying drawings and following description wherein:

FIG. 1 is a perspective illustrating the use of one application of the invention;

FIG. 2, a fragmentary section on the line 2—2 of FIG. 1;

FIG. 3, a section on the line 3—3 of FIG. 2 revealing the sliding mechanism;

FIG. 4, a perspective of a modified form of gauge;

FIG. 5, an enlarged fragmentary perspective of the gauge of FIG. 4;

FIG. 6, a perspective of a three-way dispensing valve tap;

FIG. 7, a section on the line 7—7 of FIG. 6; and

FIG. 8, a perspective of a valve adapter for application to a conventional tapping valve.

Briefly stated the invention is a sight gauge with one end adapted to be placed in communication with the pressure line which extends into the upper end of a beer keg on the like, and the other end of the gauge is adapted to be connected in valved communication with the dispensing tap valve.

With continued reference to the drawing a beer keg 10 is adapted to contain beer for dispensing through a conventional tap fitting 11 mounted in the lower end portion of the side wall thereof and having a manually adjustable valve 12 for controlling the discharge through a threaded outlet 13 of the fitting. The outlet 13 receives an internally threaded coupling 14 which connects with a discharge line 15 through which beer or other contents of the keg flows to a place of discharge at a remote location and under the control of a dispensing spigot of conventional construction, not shown. The spigot or faucet may be located behind a counter or bar or other convenient location.

Beer within the keg 10 is forced through the tap fitting 11, when the manually adjustable valve 12 is open, and through the discharge pipe 15 by means of gas under pressure from a remote source supplied through a pipe 16, a T-fitting 17, and a coupling or adapter 18 extruding through a tapped opening 19 in the top of the beer keg. This pressure is utilized to force the beer from the keg when the valve 12 is in open position and the dispensing spigot not shown also is open. In view of the fact that the barrel is opaque the structure thus described is of the usual type except for the T-fitting 17 instead of an elbow. The T-fitting permits the attachment of a tube 20 which extends to a sight gauge 21 having an elongated tubular portion and mounted on the side of the keg in a manner to be later described having graduations 22 thereon or otherwise operatively associated therewith. The lower end of the sight gauge 21 is connected by a tube 23 to a manually adjustable cut-off valve 24 tapped into the fitting 11 on the remote side of the valve 12 from the keg 10.

It is intended that beer be dispensed from the keg 10 in the usual manner with the valve 24 closed and such dispensing will not be interfered with or affected by the measuring attachment. When it is desired to determine the amount of beer retained within the keg 10, it is only necessary to open the valve 24 whereupon the liquid in the keg will be forced through the fitting 11 and the connecting tube 23 up into the sight gauge 21 until it recahes the height of the liquid level within the keg, at which time the gas pressure in the upper portion of the sight gauge and in the upper portion of the keg are equalized.

The recording of the measurement of the beer in the sight gauge can be made and at the next reading the amount of beer dispensed can be determined by simple substraction. After a reading of the amount of beer in the keg is made, the valve 24 is closed which will maintain the beer in the gauge at the level then existing in the tank and with the pressurizing gas in the upper portion of the gauge 21 above the level of the beer, as well as gas in the upper portion of the keg above the beer. Thereafter when the dispensing faucet or spigot is opened the pressure of the gas in the line 16 not only will pass through the connection 18, but also into the tube 20. Since the valve 24 is closed there will be no flow of fluid through tube 23 and the height of the beer in the sight gauge will remain static until the valve 24 again is opened.

In order to provide a graduated measuring attachment susceptible of easy application, the sight gauge 21 mounted substantially parallel alongside of and detachably supported by the keg and may be carried by a supporting clamp bracket 25 having at its upper end a right-angular loop portion 26 for supportingly engaging the sight gauge tube and having an inwardly extending angular clamping hook 27 for engagement with the upper rim of the keg and at the lower or opposite end a similar gauge supporting loop portion 28. The bracket 25 preferably is substantially the length of the keg 10 with the hook 27 extending inwardly over the upper end of the barrel, while the lower end rests on a supporting surface underlying the keg. In opposition to the hook 27 there is provided at the lower end of the support bracket an inwardly extending portion 29 of a lengthwise adjustably carried confining or clamping member 30 having at is upper end an inwardly turned lip 31 to which is attached a spring 32, the opposite end of the spring being hooked through an opening 33 in the inwardly turned upper extremity of the bracket 25.

In order to maintain the lower member 30 in alignment with the upper portion of bracket 25, the bracket may carry spaced pins 34 which extend through a slot 35 in the relatively slidable member 30. In applying this bracket 25 the lateral or inwardly extending portion 29 of the lower member 30 is inserted beneath the key for frictional anchorage and the hooked portion 27 is applied over the upper end of the same and released, whereupon the spring 32 pulls the upper portion of the bracket 25 downwardly causing the bottom inturned portion 28 thereof to engage the surface on which the keg is supported.

Instead of the bracket 25 and associated parts just described and illustrated in FIGS. 2 and 3, a somewhat different bracket may be employed as illustrated in FIGS. 4 and 5. In this embodiment of the invention the sight gauge tube 21' may be flexible and be supported by a relatively rigid graduated or indexed member 25' having at its lower end a loop 28' and a lateral extension 29'. Also at its upper end the support member 25' is provided with a reversely turned portion 26' to which a hook or angled end portion 27' is connected by means of a hinge 36, and a spring 37 urges the hook 27' downwardly towards the extension 29' for frictional engagement with the upper rim of the keg. The sight gauge tube 21' may be fastened to the support bracket 25' in any desired manner, as, for example, by means of U-clamps 38 and a pair of wedging pins 39 located one in each of the reversely bent portions 28' and 26', thus maintaining the bracket member and the sight gauge in fixed relation. In applying this type of measuring attachment the lateral portion 29' is inserted beneath the bottom of the keg and the hooked portion 27' is raised against the action of a spring 37 and hooked over the upper end of the keg.

Instead of the valve fitting 11 of FIG. 1, a modified form of fitting may be employed as illustrated in FIGS. 6 and 7. This fitting has a standard tap portion 11' with a three-way valve 40 and a threaded outlet 13' adapted to couple to the pipe 15 as previously described. In addition to the tap tube 11' and the threaded outlet 13' the valve 40 includes a threaded opening 41 into which the sight gauge tube hose 23 is attached by means of a nipple 42. Thus the valve can be located in a manner as illustrated in FIG. 7 to allow flow directly therethrough from the tap fitting 11' to the threaded outlet 13' and to the discharge spigot (not shown). When the valve handle (FIG. 6) is turned clockwise and downwardly into the second position the valve will allow flow only from the tap fitting 11' through the tube 23 to the sight gauge to obtain a reading of the quantity of liquid contained in the keg, or the valve 40 may be turned to a third position to shut off flow completely from the tap 11' when not in use or when tapping a new keg.

Instead of the fitting of FIGS. 1, 6 and 7, an adapter 43 of FIG. 8 may be employed having a threaded coupling 44 for attachment to the threaded outlet 13 of a conventional tap valve and on the opposite end of said fitting is a threaded nipple 45 to receive the coupling 14 of the tubing 15. This fitting may have a two-way valve 46 and an internally threaded opening to receive the nipple 42 to which the tube 23 attaches.

It will be apparent from the foregoing that a simple practical inexpensive and readily usable attachment for a beer or other keg is provided, and by means of which the amount of liquid in the keg can be determined and a record kept of the amount of liquid removed between readings. This makes it possible to check on any unauthorized removal or loss and also gives more accurate reading between the cash register receipts and the liquid dispensed. Likewise, it makes it possible to determine any shortage of cash in the till.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. An attachment for measuring the amount of liquid in a pressurized keg having means at one end thereof for receiving fluid pressure thereto and an outlet at the other end of the keg from which the liquid is dispensed under pressure, said attachment comprising:
   an elongated sight gauge having an elongated tubular portion adapted to be secured in position alongside of the keg,
   first means connected to the upper end of the sight gauge and adapted to be connected to the inside of the upper end portion of the keg and to its source of fluid pressure whereby the same pressure supplied to the keg is supplied to said upper end of the sight gauge,
   second means for connection to the lower end portion of the keg for the dispensing of liquid therefrom,
   third means including an adjustable flow valve connected to the lower end of the elongated sight gauge and to said second means whereby when said valve is adjusted to a liquid open flow position relative to said sight gauge the pressure in the sight gauge will be substantially equal to the pressure in the keg and cause the liquid in the sight gauge to attain the same level as the level of the liquid in the keg, and when said valve is thereafter adjusted to a closed position relative to said sight gauge, said attained liquid level in said sight gauge will be maintained until said valve is again adjusted to said liquid open flow position relative to said sight gauge.

2. An attachment as defined in claim 1 and including a support bracket structure secured to and mounting said elongated sight gauge thereon,
   said support bracket structure including clamping means having spaced relatively movable end portions spring-biased towards each other and adapted to frictionally engage the end portions of the keg for releasable mounting attachment of said sight gauge in substantially parallel relation thereto.

3. An attachment as defined in claim 2 wherein said relatively movable spring-biased and spaced end portions of said clamping means are laterally off-set and constructed for frictional engagement with the opposite end portions of the keg laterally of said sight gauge.

4. An attachment as defined in claim 3 wherein said spaced relatively movable end portions of said clamping means are of angular shape and adapted for engagement with complementary end surfaces on the keg.
   one of said angular end portions comprising a hinged supporting hook member,
   and means on said bracket structure for yieldably urging said relatively movable clamping end portions towards each other.

5. An attachment as defined in claim 1 wherein said second means includes a discharge tap fitting having an adjustable flow controlling valve therein,
   said third means including a tube connected between the lower end of said elongated tubular sight gauge and said second means,
   a liquid flow controlling valve constituting a part of said third means and forming the connection of said tube with said discharge tap fitting.

6. An attachment as defined in claim 1 wherein said elongated sight gauge includes a flexible sight gauge tube,
   a relatively rigid elongated graduated index member supporting said flexible gauge tube,
   said relatively rigid elongated supporting index member having relatively movable resiliently urged clamping end lateral extensions thereon adapted for frictional attaching engagement with the ends of the keg.

7. An attachment for measuring the amount of liquid in a pressurized keg having means at one end thereof for receiving fluid pressure thereto from a remote source and an outlet at the other end of the keg from which the liquid is dispensed under pressure, said attachment comprising:
   an elongated sight gauge having a tubular portion adapted to be secured in upright position alongside of the keg,
   means connected to the upper end of the sight gauge and providing communication with said means at one end whereby the same pressure supplied to the keg is supplied to said upper end of the sight gauge,
   an adjustable flow unitary cut-off valve having a single inlet flow passage in one end thereof having connection with two outlet flow passages therein with the flow passage in said one end thereof adapted for mounting in an outlet in the lower wall portion of the keg for control of liquid discharge therefrom,
   said adjustable flow cut-off valve having a single adjustable control member simultaneously controlling liquid flow through said two outlet flow passages, one of said two valve outlet passages comprising a liquid dispensing outlet for the keg, the other of said valve outlets having means attached thereto connecting it to the lower end of the tubular portion of said elongated sight gauge whereby when said single control member is adjusted to open said other valve outlet to a liquid flow first position relative to said sight gauge, the pressure in the sight gauge will be substantially equal to the pressure in the keg and cause the liquid in the sight gauge to attain the same level of the liquid in the keg, and when said control members is thereafter adjusted to a second position to close said other valve outlet connected to said sight gauge, said attained liquid level in said sight gauge will be maintained until said control member is again adjusted to said first position to open said other valve outlet to said sight gauge and simultaneously close said valve dispensing outlet.

References Cited by the Examiner

UNITED STATES PATENTS

| | | | |
|---|---|---|---|
| 1,075,025 | 10/1913 | Drautzberg | 73—323 |
| 1,156,998 | 10/1915 | Heberling | 73—323 |
| 1,215,801 | 2/1917 | Hancock | 222—155 X |
| 1,249,565 | 12/1917 | Wagner | 222—158 |
| 1,745,078 | 1/1930 | Collins | 222—155 X |
| 2,124,121 | 7/1938 | Postlewait | 222—25 |
| 2,510,159 | 6/1950 | Wiczer | 222—158 |
| 2,520,175 | 8/1950 | Socke | 222—155 X |
| 2,547,002 | 4/1951 | Hanson | 222—155 |
| 2,588,875 | 3/1952 | Quist | 73—290 |
| 3,145,876 | 8/1964 | McBrien | 222—450 X |

RAPHAEL M. LUPO, *Primary Examiner.*